Sept. 26, 1950     G. W. LANGFORD ET AL     2,523,507
BRAKE LINING CLAMPING DEVICE
Filed July 28, 1949     7 Sheets-Sheet 1
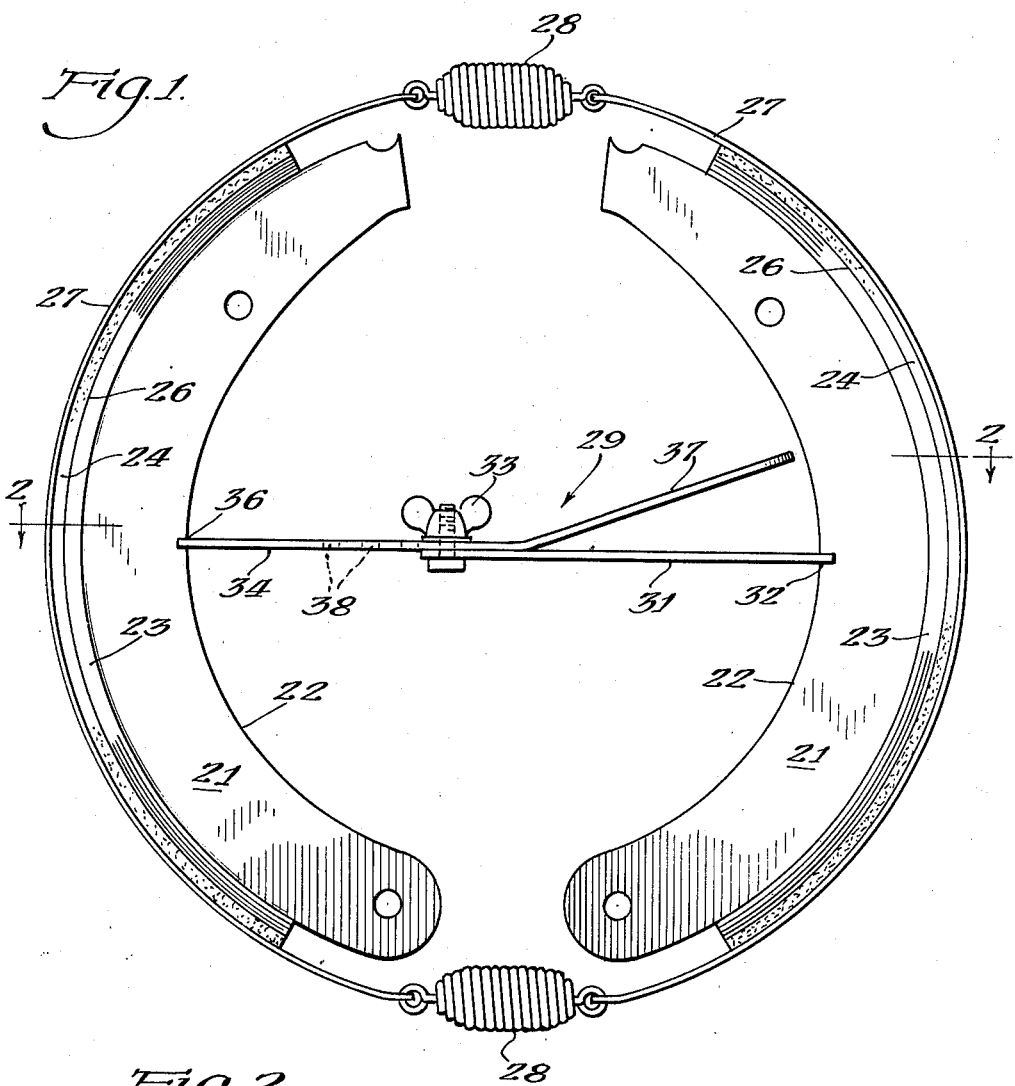
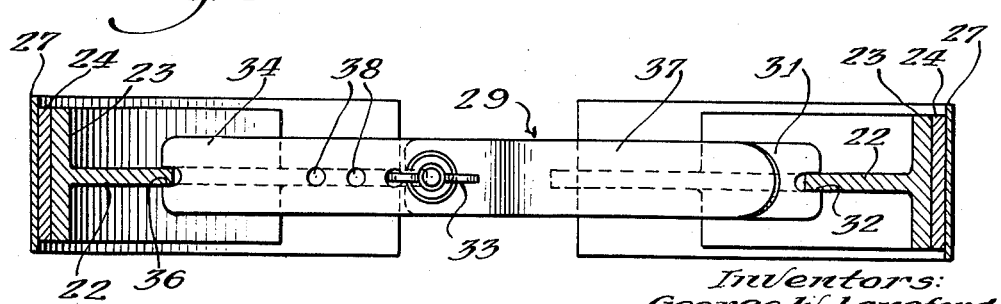
Inventors:
George W. Langford
George R. Langford
By: Wallace and Cannon
Attorneys Sept. 26, 1950 — G. W. LANGFORD ET AL — 2,523,507
BRAKE LINING CLAMPING DEVICE
Filed July 28, 1949 — 7 Sheets-Sheet 2
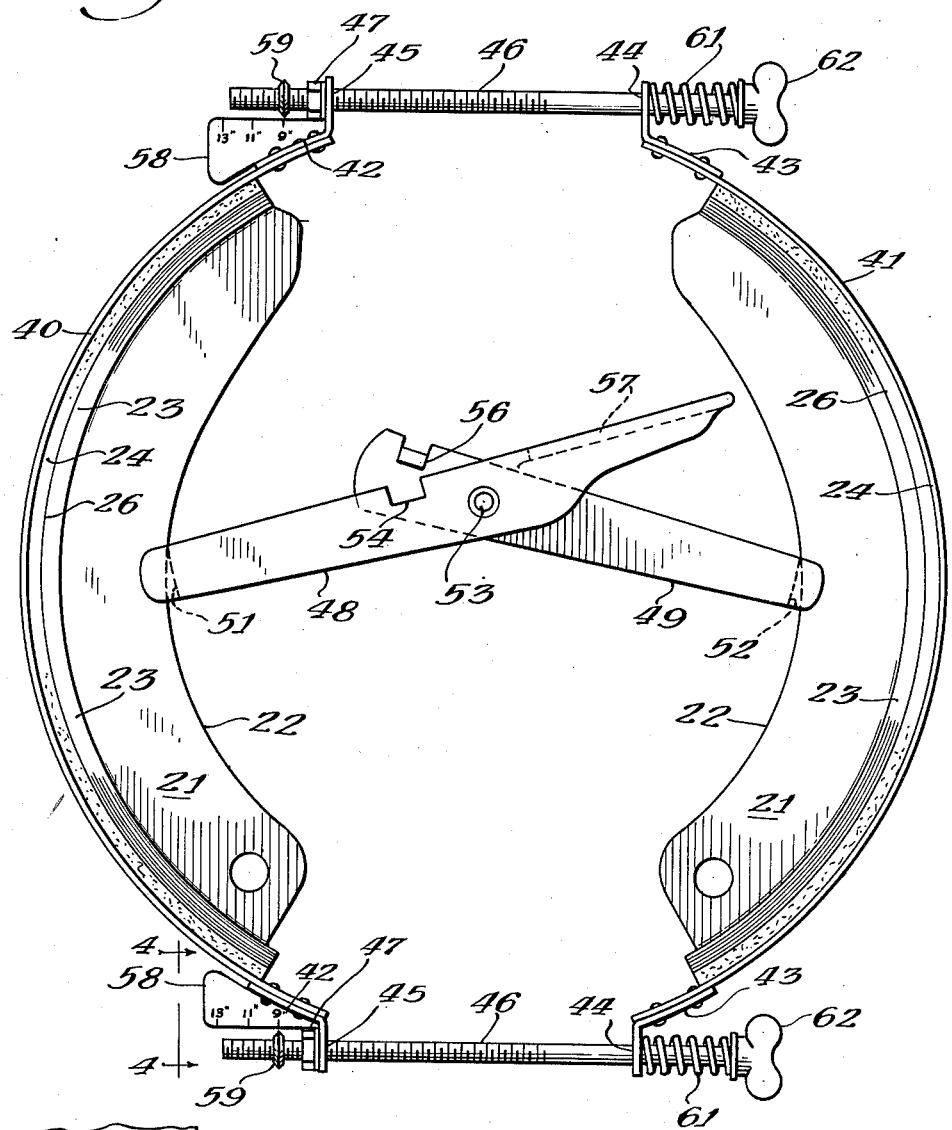
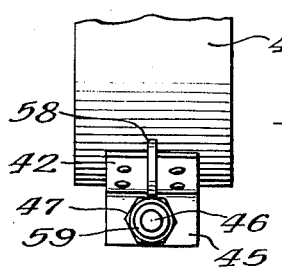
Inventors:
George W. Langford
George R. Langford
By: Wallace and Cannon
Attorneys

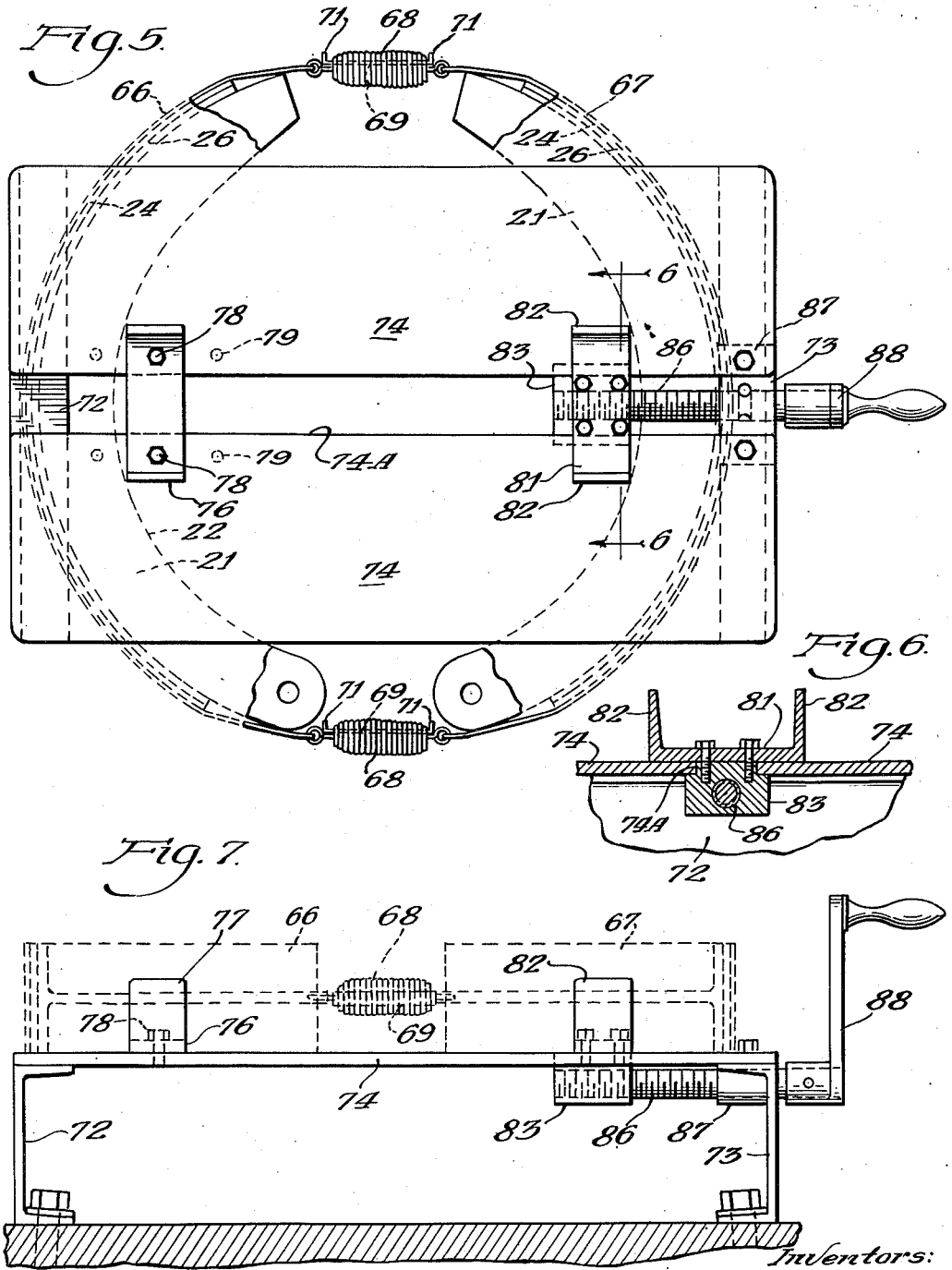

Sept. 26, 1950 G. W. LANGFORD ET AL 2,523,507
BRAKE LINING CLAMPING DEVICE
Filed July 28, 1949 7 Sheets-Sheet 5
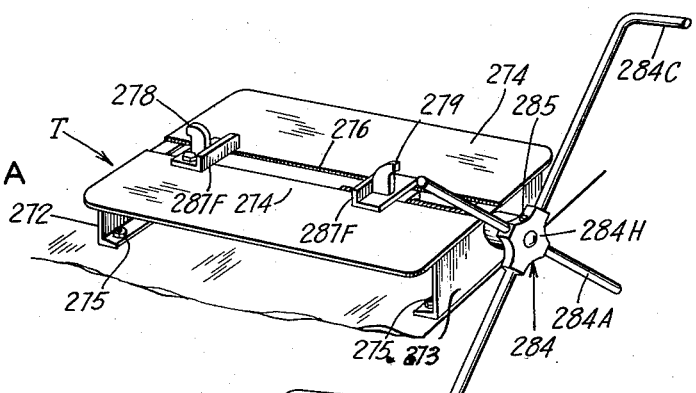
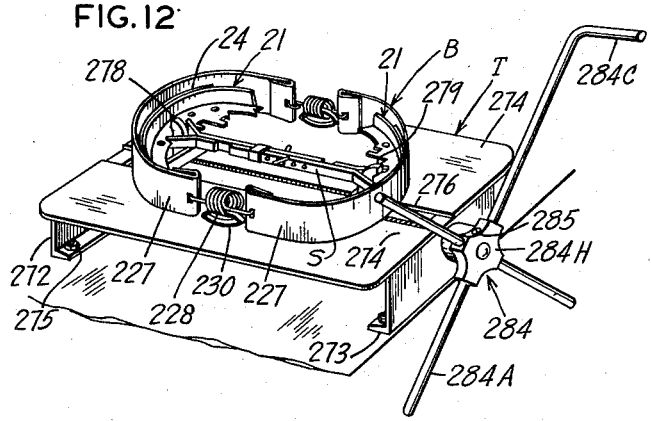
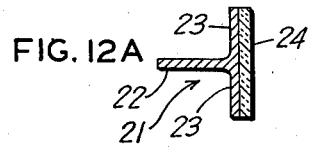
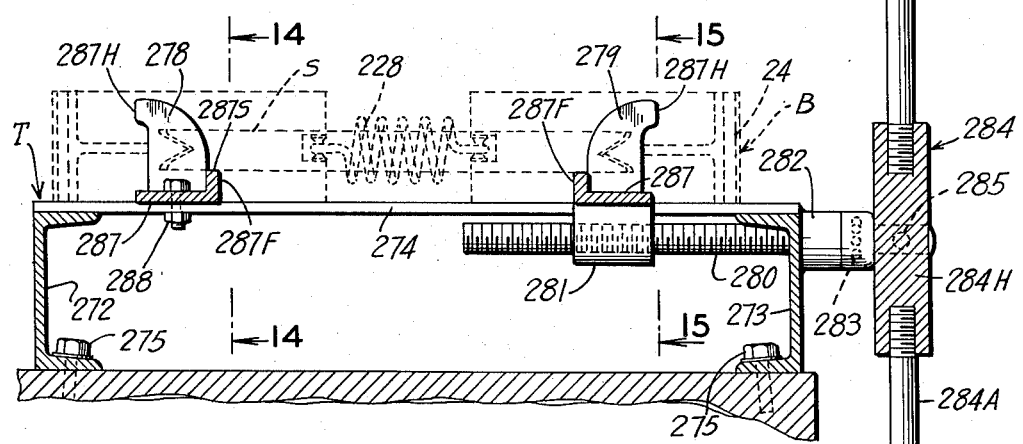
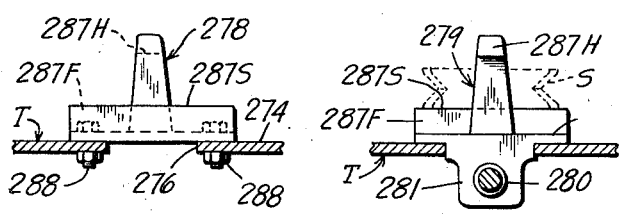
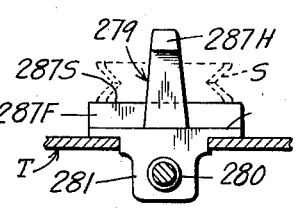
*INVENTORS*
GEORGE W. LANGFORD
GEORGE R. LANGFORD
BY Wallace and Cannon
ATTORNEYS Sept. 26, 1950  G. W. LANGFORD ET AL  2,523,507
BRAKE LINING CLAMPING DEVICE
Filed July 28, 1949  7 Sheets-Sheet 6

INVENTORS
GEORGE W. LANGFORD
GEORGE R. LANGFORD
BY Wallace and Cannon
ATTORNEYS

Sept. 26, 1950  G. W. LANGFORD ET AL  2,523,507
BRAKE LINING CLAMPING DEVICE
Filed July 28, 1949  7 Sheets-Sheet 7
FIG. 21
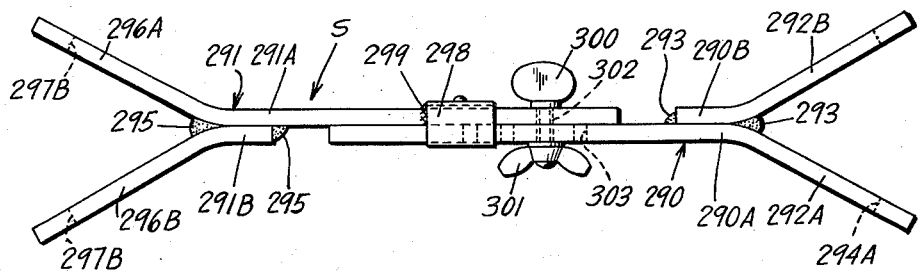
FIG. 22
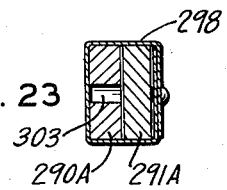
FIG. 23
FIG. 24
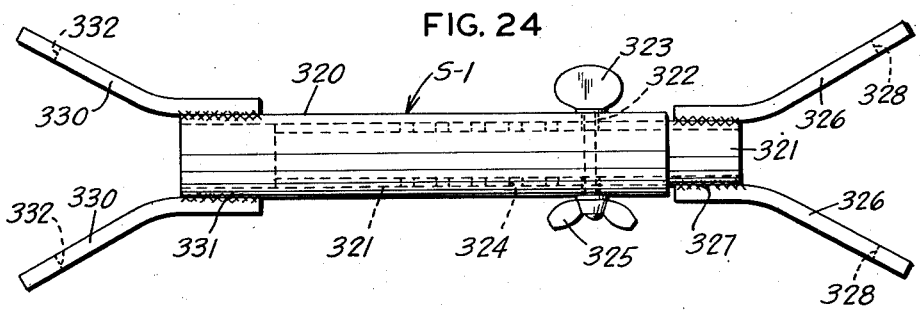
FIG. 25
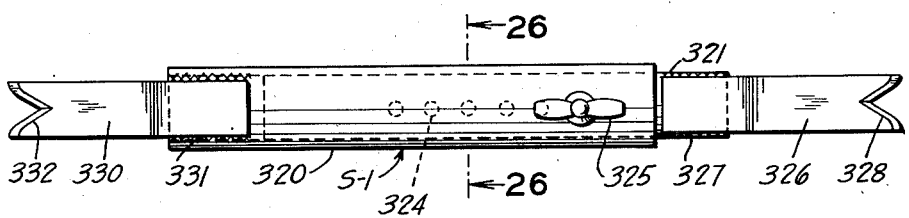
FIG. 26
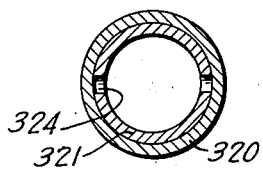
INVENTORS
GEORGE W. LANGFORD
GEORGE R. LANGFORD
BY Wallace and Cannon
ATTORNEYS Patented Sept. 26, 1950

2,523,507

UNITED STATES PATENT OFFICE 2,523,507

BRAKE LINING CLAMPING DEVICE

George W. Langford and George R. Langford, Ann Arbor, Mich., assignors to Dura-Bond, Incorporated, Ann Arbor, Mich., a corporation of Michigan Application July 28, 1949, Serial No. 107,360

20 Claims. (Cl. 154—1)

This application is a continuation in part of our pending application Serial No. 795,082, filed December 31, 1947, now abandoned.

This invention relates in general to the art of securing brake linings to brake shoes and particularly to improvements in devices for clamping or holding brake shoes and the linings therefor while the linings are cemented to the brake shoes, and also to devices for properly positioning the brake shoes prior to clamping and holding the shoes in spaced relationship with the linings therefor clamped to the shoes with a uniform pressure.

Modern design practice in the automotive industry has been to eliminate the use of rivets for securing brake linings to brake shoes and to use instead thermo-setting cement. It has been the practice to clamp the linings to the flanges of the brake shoes at a plurality of points with the cementing material held between the lining and the flange and then to heat the assembly so made to a temperature which would cause the cement to set up and secure the lining to the shoe. Such a method for securing the linings to the shoes oftentimes did not result in the linings being secured to the shoes in a uniform manner and under service conditions the linings did not perform entirely satisfactorily. Such a method for securing the linings to the shoes was also not entirely satisfactory from the standpoint of the time and effort required to be expended.

With the foregoing considerations in mind it is a principal object of the invention to secure brake linings to brake shoes in a manner which will result in satisfactory performance of the linings and which lower the cost of securing the linings to the shoes.

Another object of the invention is to secure linings to brake shoes by means of a cement having thermo-setting properties, the shoes being properly spaced and the linings to be cemented to the shoes being held thereto with a substantially uniform pressure while the cement is heated to curing or setting temperature.

Yet another object is to secure linings to brake shoes by a cementing process, the linings and the shoes being held in position with cementing material between a band encircling a pair of properly spaced pair of shoes, the band being arranged to provide a proper clamping pressure, and the shoes being properly spaced with a strut or spacer maintaining them in such proper spaced relationship as determined by the clamping pressure required from the band and the dimensions of the brake shoes.

Still another object is to prepare brake shoes and brake linings for a process whereby the linings are secured to the shoes by means of a thermo-setting cement, the preparation of the brake shoes and the linings being facilitated by a support for adjusting the shoes with their linings to a proper position in spaced relationship with the shoes and the linings held by a band providing proper pressure of the linings against the shoes, the proper spacing and pressure thus created being maintained by a strut or spacer engaging the spaced brake shoes.

Other and further objects of the present invention will be apparent from the following description and claims and are illustrated in the accompanying drawings which, by way of illustration, show preferred embodiments and the principles thereof and what we now consider to be the best made in which we have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is an elevation view of a brake lining clamp according to the present invention;

Fig. 2 is a section through the shoes and clamping band of Fig. 1 showing the spacer member or strut in plan view;

Fig. 3 is an elevation view of another embodiment of the invention;

Fig. 4 is a view looking in the direction of the arrows 4—4 of Fig. 3;

Fig. 5 is a plan view of an expander for accurately adjusting the spaced apart position of the brake shoe shown in Figs. 1 to 4 inclusive, the expander being shown for use with a brake lining clamping band of different construction from that shown in Figs. 1 to 4 inclusive;

Fig. 6 is a section taken along the line 6—6 of Fig. 5; showing the brake shoes being acted upon by the expander in phantom outline;

Fig. 7 is a front view of Fig. 5;

Fig. 11A is a perspective view of another embodiment of the invention;

Fig. 12 is a perspective view similar to Fig. 11 and showing the work in place on the apparatus;

Fig. 12A is a cross sectional view of a brake shoe and brake lining assembly;

Fig. 13 is a longitudinal sectional view taken through the apparatus of Fig. 11;

Fig. 14 is a fragmentary vertical sectional view taken along line 14—14 of Fig. 13;

Fig. 15 is a fragmentary vertical sectional view taken along line 15—15 of Fig. 13;

Fig. 21 is a plan view of a separator structure of the kind shown in Fig. 12;

Fig. 22 is a side elevation view of the structure shown in Fig. 21;

Fig. 23 is a transverse sectional view taken along line 23—23 of Fig. 22;

Fig. 24 is a plan view of a different form of separating structure.

Fig. 25 is a side elevational view of the structure shown in Fig. 24;

Fig. 26 is a cross sectional view taken substantially along the line 26—26 of Fig. 25.

Figure 8:
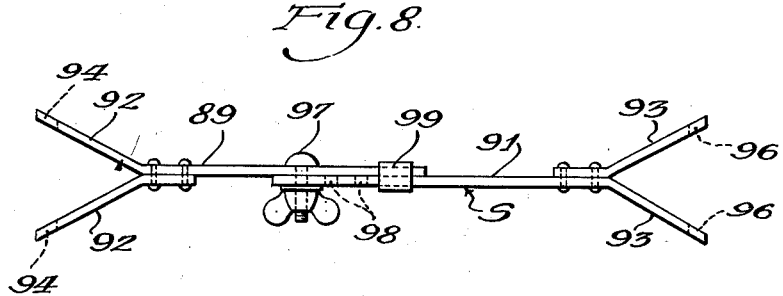
Figs. 8 and 9 are views of another form of a strut or spacer as shown in Figs. 1 to 4 inclusive, and which is particularly adaptable for use with the expander of Figs. 4 to 7 inclusive.

Referring now to Figs. 1 and 2 of the drawings the brake lining clamp is shown as being applied to a pair of brake shoes 21 which consists of webs 22 and flanges 23 integral therewith. Brake lining sections 24 are adapted to be secured to the flanges 23 by means of cementing material 26 between the lining strip 24 and the flange 23. The cementing material 26 may be in the form of one or more strips of material lying between the lining 24 and the flange 23, said strips containing thermosetting material which upon the application of sufficient heat will cement the linings to the flanges. Alternately, the cementing material 26 may be applied to the lining 24, or to the flanges 23, and the parts may then be placed in the proper relation and clamped together prior to the application of heat to set the cementing material. The type of cementing material employed, or the use of a strip of material containing the cement, form no part of the present invention and are merely alluded to for purposes of clarity.

The brake shoes 21 together with the linings 24 are then encircled by a relatively flexible clamping band consisting of a pair of band sections 27 which are connected at their ends by means of coil springs 28, to form a substantially circular band which encircles the brake shoes 21 and which is adapted to hold the lining 24 against the flanges 23.

In order to maintain the brake shoes 21 firmly against the clamping band 27 and to enable the springs 28 to place tension in clamping band to the end that there will be pressure between the linings 24 and the flanges 23, a strut or spacer member indicated generally at 29 is provided. The strut or spacer member 29 includes a portion 31 which is notched as at 32 to engage the web 22 of one of the brake shoes, the other end of the portion 31 being connected by means of a bolt and wing nut 33 to another portion 34 which also has a notch 36 to engage the web 22 of the other brake shoe, the portion 34 being also contiguous with handle part 37 struck back from the plane thereof. The point of connection of the portion 31 to the portion 34 may be suitably changed according to the dimensions of the brake shoes 21 by means of a plurality of holes 38 formed therein to receive the bolt and wing nut 33.

The apparatus thus far described is easily and conveniently assembled by first placing the clamping band 27 around the lining 24 which is to be cemented to the flanges 23. The strut or spacer 29 is then caused to engage the webs 22 of the brake shoes 21 at the notches 32 and 36, the axes of the portions 31 and 34 being at an angle of less than 180°. The shoes 21 are then spread against the clamping band 27 by making the axes of the members 31 and 34 coincidental, the struck-out part 37 conveniently serving as an actuating handle to effect this operation. The wing nut 33 is then tightened so that the spacer member 29 is maintained in the position just described. With the spacer member 29 in the position just described a load will be placed on the springs 28 and the clamping band 27 will thereby press the lining 24 against the flanges 23 with the required amount of pressure. The assembly is then placed in an oven or other suitable heating device and the associated parts, including the cement 26 are heated to a curing or setting temperature which is maintained for a curing period sufficient to cause the linings to be firmly cemented to the flanges 23. During such curing period, a substantially uniform pressure is exerted at all portions of the flanges 23, thereby insuring a firm and secure bond between the lining 24 and the web 23.

Referring now to Figs. 3 and 4 there is shown another embodiment of the invention characterized by the attainment of the desired adjustability through the use of a constant stroke expander and an adjustable pressure band assembly. The brake shoes 21 which consist of webs 22 and flanges 23 have cemented thereto at the flanges 23 the linings 24, and are encircled by a clamping band consisting of sections 40 and 41, section 41 having riveted at the ends thereof lugs 43 which are apertured as at 44. Band section 40 has riveted at the ends thereof lugs 42 which are apertured as at 45, the apertures 44 and 45 being adapted to receive elongated thumb screws 46 which are to receive elongated thumb screws 46 which are threaded into nuts 47 secured, preferably by welding, to the lugs 45. Means are provided for properly spacing the shoes 21 which are held in the clamping band made up of the sections 40 and 41. To this end the webs 22 are adapted to be engaged by arms 48 and 49 which are slotted respectively at 51 and 52, and which are connected by a pin as at 53. The arm 48 is provided with a notch 54 which is adapted to cooperate with an ear 56 struck out from the arm 49, and is also provided with an elongated flat struck-out portion 57 to provide a surface to be pressed against by the user and to provide a stop against the arm 49, the notch 54 of the arm 48 and the ear 56 of the arm 49 also providing a stop. The arms 48 and 49 are preferably so designed that in coming to the position where the slot 54 is in engagement with the ear 56 the arms will override the toggle axis passing through the pin 53 and the arms 48 and 49, so that there will be no tendency of the arms 48 and 49 to snap back to the unclamped or released position shown in Fig. 3.

Means are provided for indicating the proper spacing of the bands 40 and 41 according to the diameter of the shoes 21, and to this end the lugs 42 have brazed thereto indicator plates 58 which extend along the end portions of the screw 46, and indicators 59 which are secured as by brazing on screws 46. It will be apparent that as the thumb screw 46 is turned, the indicators 59 will move with reference to the indicator plates 58 to indicate the proper setting of the bands 40 and 41 according to the diameter of the brake shoes 21 to be used therewith, the indicator plates 58 being shown with markings indicating common brake shoe diameters.

In order to place proper tension on the bands 40 and 41 to the end that a suitable pressure is developed between the brake shoe 24 and the flange 23, so that the cement 26 will properly bond the lining 24 to the flange 23, a spring 61 is mounted on the thumb screw 46 and lies between the lugs 44 and the headed or wing end of the thumb screw 46.

The embodiment of the invention thus described with reference to Figs. 3 and 4 is assembled in a manner similar to that of the embodiment shown with reference to Figs. 1 and 2. The brake shoes 21 are placed in position and encircled by the clamping band consisting of sections 40 and 41. The thumb screw 46 is turned until the indicators 59 are positioned corresponding to the diameter of the shoes being relined. The hinged strut or spacer member is then placed inside the shoes 21 so that the arms 48 and 49 engage the webs 22, and then the arms 48 and 49 are moved to the extended position wherein the ear 56 engages the slot 54. The brake shoes 22 thus assembled with the linings 24 against the flanges 23 are then placed in an oven and the temperature raised to the curing value whereby the cement will, during the proper period, be caused to set up and securely bond the linings 24 to the flanges 23. By the arrangement thus described the linings 24 are always held to the flanges 23 with a uniform cementing pressure. By the use of the indicator plates 58 and the indicator members 59, proper tension on the spring 61 may be readily attained, it being apparent, of course, that different sized hinged strut or spacer members must be used according to the diameter of the brake shoes to be relined.

Referring now to Figs. 5 to 9 there is shown a novel arrangement for effecting the proper spacing and clamping of the brake shoes 21 and the linings 24 to be cemented thereto, the shoes being adapted to be encircled by another form of clamping band consisting of portions 66 and 67, the ends of the band being connected by contractile coil springs 68. The springs 68 are provided with means for indicating the permissible limit of stretch thereof, so that the springs will not be overstretched and take a set, which would impair their usefulness, and also so that the springs would not be stretched to an amount which would create too great a pressure between the linings 24 and the flanges 23, which might impair the bonding of the linings 24 to the flanges 23. To this end the springs 68 are provided with simple clips or indicating stops 69 extending the length of the springs and having bent-up portions 71 exterior of the ends of the springs 68.

In order to facilitate the proper positioning of the brake shoes 21, the shoes may be spread on an expansion table prior to the placing of either of the strut or spacer members of Figs. 1 to 4 or of another and simplified type of separator bar as will be more fully explained with reference to Figs. 8 and 9 hereinafter. The expansion table consists of a pair of spaced channels 72 and 73 which have welded thereto a pair of laterally spaced plates 74 which provide a support for the brake shoes 21 and for any of the clamping bands described thus far. The plates 74 are provided with a fixed abutment 76 formed of a channel with upstanding flanges 77 which are adapted to engage the webs 22 of one of the brake shoes 21. The fixed abutment 76 extends across the clearance space 74A between the plates 74 and is held to the plates 74 by means of cap bolts 78 which may be threaded into various pairs of holes 79 formed in the plate 74 according to the size of the brake shoes being relined. A movable abutment is also provided with the plate 74 for engaging the web 22 of the other brake shoe and consists of a channel 81 with upstanding flanges 82 adapted to contact the web 22, the channel being bolted to a guide block or nut 83 adapted to move in the guide slot 74A formed between the plates 74. This is effected by rotation of a screw 86 which is threaded through the nut 83, is journaled at 87 and held against endwise movement in the channel 73. The screw 86 is shown as being actuated by a crank 88, but it will be evident that other forms of hand or power actuation may be provided for sliding the abutment 81 through the desired stroke. With the arrangement thus described it will be apparent that the shoes 21 may be spread to the required distance against the action of the springs 68, and the strut or spacer members of Figs. 1 to 4 inclusive may then be placed to engage the webs 22 of the brake shoe 21.

Figure 9:
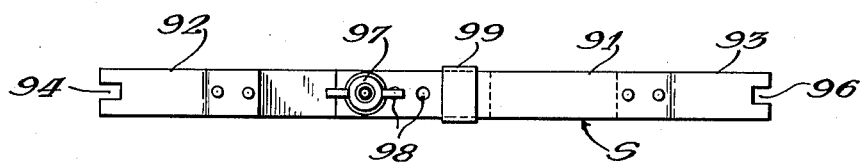

The strut or spacer member of Figs. 1 to 4 provides of course for application of separating forces to the two brake shoes against the force of the springs, as 68, and since this is but a duplication of the function of the tensioning abutments 76 and 81, we prefer to use a simplified spacer S of the character shown in Figs. 8 and 9. The spacer S may be conveniently adjusted to any length according to the diameter of the brake shoes being relined. As shown, the spacer member consists of two halves 89 and 91 respectively at 94 and 96 to engage the webs 22 of the brake shoes 21. The half 89 is provided with bolt and wing nut 97 which cooperate with holes 98 in the half 91 to adjust the length of the spacer member according to the size of the brake shoes. The members 89 and 91 may be locked together by means of a collar 99 which is adapted to slip over portions 89 and 91 in spaced relation to the location of the wing nut 97.

In using the expansion table shown in Figs. 5 to 7, the shoes 21 are placed against the outside faces of the abutments 76 and 81, and the clamping band as shown in Fig. 1, or in Fig. 4, is placed around the shoes 21 and positioned to rest on the table 74. The crank 88 or other actuating means is then operated to move the abutment 81 in a direction to spread the shoes and tension the springs, as 68 of the band. Such tensioning is continued until the indicators 69 indicate proper tensioning, and the spacer is then put in place. The crank 88 or other power means is then reversed until the separator bars are held in position in engagement with the shoes by the tension in the springs associated with clamping band.

The arrangement of Figs. 8 and 9 is particularly adaptable to be used with the expansion table of Figs. 4 to 6 inclusive. The strut or spacer member according to Figs. 8 and 9 is of course readily adapted to be adjusted to various lengths, according to the size of the brake shoes 21; and according to the diameter of the brake shoes 21, the abutment 76 may be positioned in various pairs of mounting holes 79. With the use of the clips 71 as shown in Fig. 6 it is impossible to over-stretch the springs 68, the operator being readily apprised of the desired limit of stretch of the springs 68.

The brake lining clamp assembly thus made by the embodiment of the invention as shown in Figs. 4 to 9 is then removed from the expander 74 by backing off the crank 88 and the assembly is placed in an oven and heated for the desired curing period and at the proper curing temperature which will cause the cement 26 to set up and firmly and evenly bond the lining 24 to the flange 23. When the assembly thus described has been heated for a proper period it may be withdrawn from the oven and placed on the expansion plate and the reverse operations performed on the brake shoes 21, the shoes then being ready for installation on vehicles.

Figure 10:
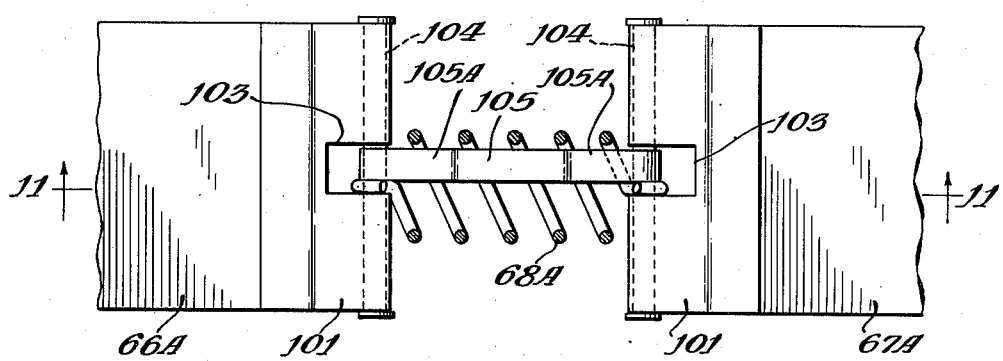
Figs. 10 and 11 are views of another form of tension limiting and indicating means associated with the clamping band.
Figure 11:
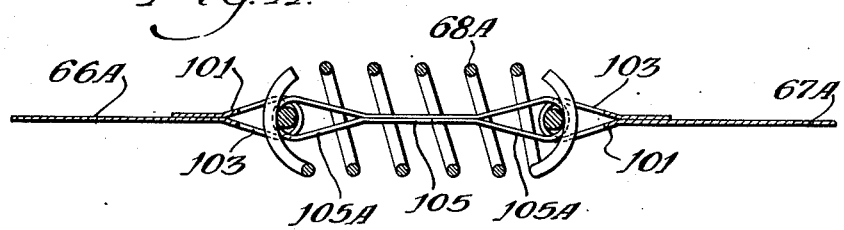
Figure 16:
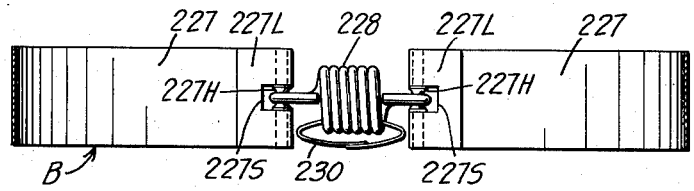
Fig. 16 is a sectional view of a pressure applying band of the kind shown in Fig. 12, the view being taken substantially along the line 16—16 of Fig. 17.

The tension limiting and indicating means afforded by the bar or clip 69 may take other forms, as illustrated in Figs. 10 and 11. Thus the band sections may be afforded the band sections 66A and 67A having looped ends 101. Across the looped ends 101, slots 103 are formed to expose the central portions of anchoring pins 104 that are extended through the looped ends 101. The opposite ends of a spring 68A are anchored on the pins 104, and through the coil of each spring a tension limiting and indicating link 105 is extended. This link 105 is formed from a flexible metal strip of high strength by reversely bending opposite ends thereof to afford end loops 105A, and the ends of the strip are secured as by welding to afford a link of a predetermined maximum length. The end loops 105A are also anchored on the pins 104 within the slots 103, as shown in Figs. 10 and 11.

In use the links 105 normally assume a loose and somewhat bent position within the encircling spring, and as a tensioning operation progresses, the link 105 has its slack taken up until the full desired tension is reached. The separator or spacer S may then be put in position, and it should be noted that if the indication afforded by the link 105 shows that the springs 68A have been properly tensioned, the operator will at once discover an improper adjustment of the length of the spacer S. Thus proper pressure on the brake lining will be attained and maintained after the assembly has been removed from the tensioning table.

In Figs. 11A to 15, the invention is illustrated as embodied in a brake lining applying apparatus which comprises a clamp-expanding table T, a contractile clamping band B, and a spreader structure S whereby a pair of brake shoes 21, with applied brake lining sections 24, as hereinbefore described, may be placed in opposed relation with the band B on the table T and after expansion or spreading of the shoes 24 against the contractile force of the band B by the table mechanism, the spreader S may be put in place between the shoes so that after release of the spreading mechanism, the brake lining sections will be retained in tightly clamped relation on the shoes by the contractile force applied by the band B.

Each of brake shoes 21 consists of integral webs 22 and flanges 23, as hereinbefore described, and the brake lining sections 24 are adapted to be secured to the flanges 23 by means of cementing material 26 between the lining strip 24 to the flanges 23. The cementing material 26 may be in the form of one or more strips of material lying between the lining 24 and the flange 23, said strips containing thermo-setting material which upon the application of sufficient heat will cement the linings to the flanges. Alternately, the cementing material 26 may be applied to the lining 24, or to the flanges 23, and the parts may then be placed in the proper relation and clamped together prior to the application of heat to set the cementing material. The type of cementing material employed, or the use of a strip of material containing the cement, form no part of the present invention and are merely alluded to for purposes of clarity.

The brake shoes 21 together with the linings 24 are then encircled by the relatively flexible clamping band B which consists of a pair of band sections 227 which are connected at their ends by means of coil springs 228, to form a substantially circular band which encircles the brake shoes 21 and which is adapted to hold the lining 24 against the flanges 23.

As best shown in Figs. 16 to 19, each band section 227 has its opposite ends reversely bent to form relatively flat, transversely extending anchoring loops 227L, the reversely bent ends being secured in place against the main body portions of the band section, as by welding. Substantially midway between the edges of the band section, each loop 227L has a relatively wide clearance slot 227S, and in attaching the end hooks 228H of the springs to the band sections 227, anchoring pins 227P are placed within the respective anchoring loops 227L and the hooks 228H are passed through the slots 227S so as to engage the portions of the pins 227P that are exposed within such slots. In order to hold the pins 227P in position, each pin has an enlarged spool-like head 227H formed thereon and each such head is of a length which corresponds to the width of the slots 227S. Thus the spool-like head 227H presents oppositely facing annular shoulders at its ends, and these shoulders engage the edges of the related slot 227S to hold the pin against endwise displacement. The relative flatness of the loops 227L cooperates, of course, in maintaining such retaining relation.

Figure 17:
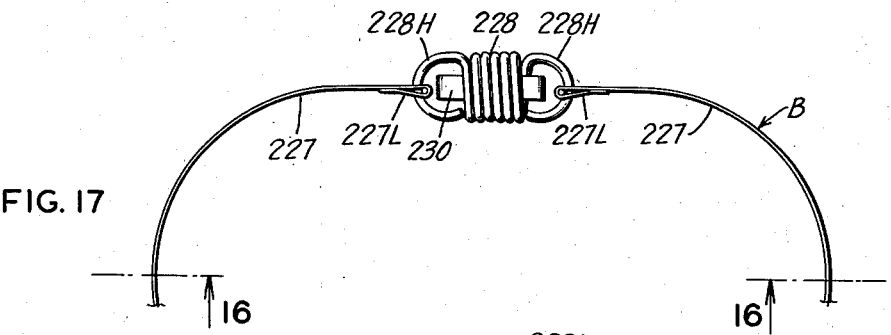
Fig. 17 is a plan view of the apparatus shown in Fig. 16.
Figure 18:
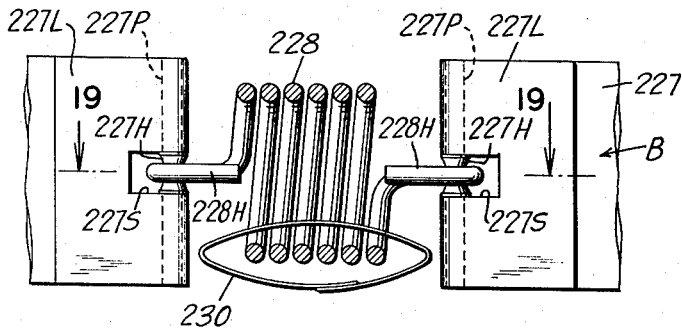
Fig. 18 is an enlarged detailed view showing a portion of Fig. 16.
Figure 19:
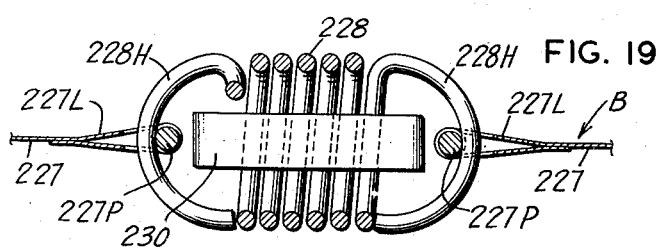
Fig. 19 is a plan section taken substantially along line 19—19 of Fig. 18.

For the purpose of indicating when the desired degree of tension has been placed on the springs 228, means are associated with springs to afford a measure of the elongation or tension thereof. As shown in Figs. 16 to 19, such means comprise an endless indicator band 230 which is made of strap steel and extended through and about the coil of each spring 228. The ends of the strap are joined by welding so as to afford an elongated loop as shown in Figs. 17 and 18, and the length of this loop is such that when the end coils of the spring 228 engage the ends of the loop, a proper tensioning of the spring 228 will be indicated.

The expansion table T consists of a pair of spaced channels 272 and 273 that have a pair of laterally spaced plates 274 welded to the upper flanges of the channels 272 and 273. The other or lower flanges of the channels 272 and 273 are adapted to be secured by means such as bolts 275 to a mounting table or work-bench, as shown in Fig. 13 of the drawings. The lateral spacing of the two plates 274 affords a longitudinal slot 276 between the two plates, and means are afforded along this slot for applying an expanding or separating force to a pair of brake shoes 221 that have been disposed within a band B that is positioned on the flat upper surface afforded in the table T by the two plates 274.

For the purpose of applying a separating force to the two brake shoes that are thus positioned upon the top of the table T, a pair of relatively separable abutments 278 and 279 are provided on the table and at spaced points along the slot 276. The abutment 279 is in the present case mounted in a fixed position on the top of the table, as will be described hereinafter, while the abutment 279 is arranged for longitudinal adjustment along the slot 276, this adjustment being attained by means including an operating screw 280 which is disposed beneath the slot 276 and which is threaded into a downwardly projecting nut 281 that is rigid with the abutment 279.

The screw 280 is extended in what may be termed a forward direction through the web of the channel 273 and extends through a projecting bearing 282 that is welded to the outer face of the web of the channel 273. Outwardly of the bearing 282, a ball thrust bearing 283 surrounds the screw shaft 280, and just beyond the ball thrust bearing 283, an operating handle 284 is secured to the screw shaft by means such as a set screw 285. In the present instance, the operating handle 284 takes the form of a central hub 284H having a plurality of arms 284A extended radially therefrom, and one of these arms, as shown in Figs. 11 and 12, has a laterally projecting crank handle 284C to facilitate rapid operation of the operating handle 284.

Both of the abutments 278 and 279 are generally similar in form and constitute a flat base portion 287 and an upstanding flange portion 287F that terminates in an upper flat surface 287S. The flange 287F is in each instance disposed so as to be located adjacent to the opposite one of the two abutments, and these abutments extend upwardly from the base 287, and at their upper ends have a projecting hook 287H which serves as a retaining means to prevent undesired upward displacement of the brake shoe that may be engaged by the abutment.

The abutment 278 is secured to the plates 274 by means such as bolts 288 that extend downwardly through the base 287 and into the respective plates 274. The abutment 278 has the nut portion 281 cast as an integral downwardly projecting part of the base 287, as shown in Fig. 15, and the width of the nut 281 is such that it may be inserted downwardly through the slot 276 and in engagement with the sides of the slot so as to be guided thereby. In this connection it should be observed that the engagement of the nut 281 with the screw 280 has been found to be effective to hold the abutment 279 downwardly in the desired relationship with respect to the top of the table T.

A pair of brake shoes 21 in position within a band B may thus be placed in a position on top of the table T and by manipulation of the operating handle 284, the abutment 279 may be moved forwardly so as to tension the springs 228, and when the end coils of the springs 228 engage the end portions of the indicating bands 230, the operation of the handle 284 is terminated, and the spreader structure S is put into position substantially as shown in Figs. 12 and 13 of the drawings, so as to rest on the upper surfaces 287S of the flanges 287F, after which the handle 284 is operated in a reverse direction so as to allow the flanges of the brake shoes to come into operative engagement with the opposite ends of the spreader structure S. The brake shoes 21, together with the clamping bands B and the spreader structure S, then becomes a unitary structure which may be readily handled by grasping the spreader structure, and thus such an individual assembly may readily be moved from the table T and may be placed in an oven where the proper period of high temperature curing may be applied to the adhesive so as to secure the brake lining to the shoes.

Figure 20:
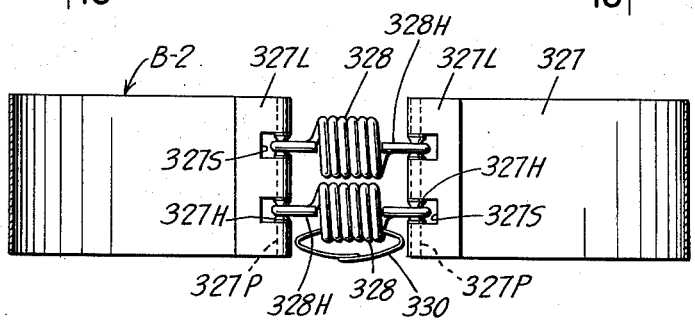
Fig. 20 is a view similar to Fig. 16 and illustrating a clamping band of greater width.

When relatively large and wide brake shoes are to have lining applied thereto, the lining is clamped on the shoes by a somewhat wider band structure B—2, shown in Fig. 20 of the drawings, and in such band structure similar sections 327 are afforded that are connected together by pairs of springs 328. The ends of the bank sections 327 have loops 327L similarly formed thereon, and in each such loop, a pair of slots 327S are formed. These slots 327S serve to receive heads 327H that are formed on retaining pins 327P, and thus two springs 328 may be connected to each such pin 327P in the same way as the springs 228 heretofore described. This structure thus affords adequate width in the band sections 327, and proper spring tension by means of the double springs 328 on each side of the band, and in this structure, an indicating band 330 is associated, as shown in Fig. 20, with one spring 328 on each side of the band B—2.

In Figs. 21 to 23 of the drawings, a preferred embodiment of the spreader structure S is illustrated. Such spreader structure comprises a pair of adjustable sections 290 and 291 that are made from relatively heavy strap steel. Thus the section 290 comprises a main member 290A that is bent outwardly at 292A to afford one arm for the spreader structure and a second and somewhat shorter member 290B is secured as by welding 293 to the member 290A so as to afford another arm 292B that diverges from the arm 292A. These two arms 292A and 292B have V-shaped notches 294A and 294B formed in their ends so that these V-shaped notches may engage with the flange of a brake shoe, or may engage reenforcing means associated with such flange, at points which, in the use of the device, are located in spaced relation and on opposite sides of one of the abutments 278 or 279.

The other section 291 of the spreader S is similarly formed by a main member 291A and a secondary member 291B and these members are joined together by welding 295 to afford diverging arms 296A and 296B which have V-shaped notches 297A and 297B in their end portions. The member 291A has a guideband 298 secured thereto as by welding at 299 and affording a guiding loop through which the main body of the member 290A may be moved and guided. The effective length of the spreader structure S, or in the words the longitudinal spacing between the notches 294 and 297 at opposite ends thereof, may be adjusted by means including a thumb screw 300 and a wing nut 301. The thumb screw 300 is extended through an opening 302 in the member 291A, and is adapted to be extended through any selected one of a plurality of openings 303 that are formed at spaced points along and in the member 290A. Thus the effective lengths of the spreader S may be adjusted so that when the springs 228 have been tensioned to the required amount, as shown by the indicating bands 230, the spreader S may be placed in position with the end notches thereof located relatively close to the flanges of the brake shoes. Through this arrangement, the required releasing movement that is required for the abutment 279 is relatively small, and the flanges of the brake shoes will engage and set in the notches of the spreader S while the springs 228 remain under substantially full tension.

In Figs. 24 to 26 of the drawings, another form of spreader structure is shown, and such spreader structure is indicated herein by the reference character S—I. In the spreader S—I, the main body portions are afforded by a pair of tubes 320 and 321 that are arranged in a longitudinally telescoped relationship. The outer tube 320 has a pair of aligned openings 322 formed diametrically thereof and adjacent to one end, and a thumb screw 323 is adapted to extend through these openings and through any one of a plurality of longitudinally spaced pairs of openings 324 that are formed in the inner sleeve 321. A wing nut 325 is adapted to be placed on the other end of the thumb screw 323 to hold the tubes 320 and 321 in the desired position of longitudinal adjustment. On the exposed end of the tube 321, a pair of divergent arms 326 are secured as by welding at 327, and these diverging arms have V-shaped notches 328 in their ends so as to be engageable with the flange of a brake shoe, or with flange reenforcing means, in the same manner as hereinbefore described with respect to the other form of spreader S—I. Similar arms 330 are secured as by welding at 331 to the outer surface of the tube 320 adjacent the opposite ends of the structure, and these arms diverge and have V-shaped notches 332 formed therein for similar engagement with the other brake shoe that is to be clamped by a particular clamping band B.

The invention has been described with reference to a number of embodiments which it may assume in practice. It is possible, by the use of the invention described herein, to bond linings to brake shoes with great facility and with the assurance that the linings will be firmly and evenly bonded. The spring arrangements described insure that the pressure maintained between the linings and the flanges of the brake shoes will be uniform all during the cementing process. The various arrangements described for insuring against overstretching of the springs for maintaining the cementing pressure, insure that the characteristics of the clamping bond will not change with usage. While the processes and operations have been described in great detail, the actual operation mounting the linings on the shoes for bonding them is actually very simple and very rapid, and makes it possible to bond linings to brake shoes in a manner not possible heretofore.

Thus, while we have illustrated and described the preferred embodiments of our invention, it is to be understood that these are capable of variation and modification and we therefore do not wish to be limited to the precise details set forth, but desire to avail ourselves of such changes and alterations as fall within the purview of the following claims.

We claim:

1. In a brake lining clamp adapted for use in cementing brake lining to brake shoes of the type consisting of a web and a flange to which said brake lining is cemented; a clamping band for encircling a pair of spaced brake shoes and contacting said brake lining, spring means connected between adjacent portions of said clamping band and carried by said clamping band to maintain pressure between said lining and said shoe, and means for engaging the webs of said brake shoes to tension said means with said band in clamping relation about said shoes.

2. In a brake lining clamp adapted for use in cementing brake lining to a brake shoe of the type consisting of a web and a flange to which said brake lining is cemented; a clamping band comprising a plurality of band portions for encircling a pair of spaced brake shoes and contacting said brake lining, spring means connected between adjacent portions of said clamping band and carried by said clamping band to maintain pressure between said lining and said shoe, and means for spreading said brake shoes to tension said spring means and maintain said brake shoes in proper spaced position.

3. In a brake lining clamp adapted for use in cementing brake lining to a brake shoe of the type consisting of a web and a flange to which said brake lining is cemented; a clamping band comprising a plurality of band portions for encircling a pair of spaced brake shoes in contact with said brake lining; spring means connected between said band portions for maintaining pressure between said lining and said shoe, and means for spreading said brake shoes locking same in proper spaced position with said band portions held under clamping tension by said spring means.

4. In a brake lining clamp adapted for use in cementing brake lining to a brake shoe of the type consisting of a web and a flange to which said brake lining is cemented; a clamping band for encircling a pair of spaced brake shoes in contact with said brake lining, spring means associated with said clamping band to maintain pressure between said lining and said shoe, and a toggle strut for engaging said webs and adapted to spread said shoes apart and to be locked into position for maintaining said shoes in proper spaced position.

5. In a brake lining clamp adapted for use in cementing brake lining to a brake shoe of the type consisting of a web and a flange to which said brake lining is cemented; a clamping band member for encircling a pair of spaced brake shoes in contact with said brake lining, spring means associated with said clamping band member to maintain pressure between said lining and said shoes, a hinged member strut for engaging said webs to spread the same apart and adapted to be locked into position for maintaining said shoes in proper spaced position, and means for adjusting the length of one of said members to accommodate different sizes of brake shoes.

6. In a brake lining clamp adapted for use in cementing brake lining to a brake shoe of the type consisting of a web and a flange to which said brake lining is cemented; a clamping band comprising a plurality of band portions for encircling a pair of spaced brake shoes and contacting said brake lining; spring means associated with said clamping band to maintain pressure between said lining and said shoe, and an adjustable spreading toggle for engaging said webs to separate the same and adapted to be locked into position for maintaining said shoes in proper spaced position.

7. In a brake lining clamp adapted for use in cementing brake lining to a brake shoe of the type consisting of a web and a flange to which said brake lining is cemented; a clamping band comprising a plurality of band portions for encircling a pair of spaced brake shoes and contacting said brake lining, spring means connected between adjacent portions of said clamping band and carried by said clamping band to maintain pressure between said lining and said shoe, means for spreading said brake shoes and maintaining said brake shoes in proper spaced position, and means associated with said spring means for adjusting the effective length of said band.

8. In a brake lining clamp adapted for use in cementing brake lining to a brake shoe of the type consisting of a web and a flange to which said brake lining is cemented; a clamping band comprising a plurality of band portions for encircling a pair of spaced brake shoes and contacting said brake lining, spring means connecting said band portions for maintaining pressure between said lining and said shoes, means for spreading said brake shoes and maintaining said brake shoes in proper spaced position, and means associated with said spring means for indicating the proper tensioning of said spring means.

9. In a brake lining clamp adapted for use in cementing brake lining to a brake shoe of the type consisting of a web and a flange to which said brake lining is cemented; a clamping band comprising a plurality of band portions for encircling a pair of spaced brake shoes and contacting said brake lining, means connecting said band portions, a spring means connected between adjacent portions of said connecting means and carried by said connecting means to maintain pressure between said lining and said shoe, and means for spreading and maintaining said brake shoes in proper spaced position.

10. As an element of a brake lining clamp adapted for use in cementing brake lining to a brake shoe of the type consisting of a web and a flange to which said brake lining is cemented; a clamping band comprising a plurality of band portions for encircling a pair of spaced brake shoes in contact with said brake lining, springs connecting said band portions, and means associated with said spring means to indicate proper tensioning thereof.

11. As an element of a brake lining clamp adapted for use in cementing brake lining to a brake shoe of the type consisting of a web and a flange to which said brake lining is cemented; a clamping band for encircling a pair of spaced brake shoes in contact with said brake lining, said clamping band comprising a pair of band portions, and a pair of tension springs extended between adjacent ends of said band portions to maintain pressure between said lining and said shoe.

12. In an apparatus for tensioning a resilient clamping band structure about a pair of brake shoes to resiliently clamp brake lining to the flanges of such brake shoes, said apparatus comprising a work table upon which such a pair of brake shoes and an encircling band structure may rest, a fixed abutment and a shiftable abutment extending upwardly from said table and adapted to engage adjacent surfaces of such a pair of brake shoes, and means for moving said shiftable abutment away from said fixed abutment to tension said band.

13. In an apparatus for tensioning a resilient clamping band structure about a pair of brake shoes to resiliently clamp brake lining to the flanges of such brake shoes, said apparatus comprising a work table upon which such a pair of brakes and an encircling band structure may rest, a pair of relatively separable abutments projecting upwardly from said table in positions to engage the adjacent surfaces of such a pair of brake shoes, and means for effecting relative separating movement of said abutments.

14. In an apparatus for tensioning a resilient clamping band structure about a pair of brake shoes to resiliently clamp brake lining to the flanges of such brake shoes, said apparatus comprising a work table upon which such a pair of brakes and an encircling band structure may rest, a fixed abutment and a shiftable abutment extending upwardly from said table and adapted to engage adjacent surfaces of such a pair of brake shoes, means for mounting said fixed abutment in different positions on said table, and means for moving said shiftable abutment away from said fixed abutment to tension said band.

15. In a brake lining clamp adapted for use in cementing brake lining to a brake shoe of the type consisting of a web and a flange to which said brake lining is cemented; a clamping band comprising a plurality of band portions for encircling a pair of spaced brake shoes and contacting said brake lining, each end of each of said portions being reversely bent and secured to the main body of such portion to afford a transversely extending loop at each such end, each such loop having a slot formed therein, an anchoring pin disposed with each such slot and having an enlarged head portion formed thereon and disposed within the slot of the loop in which the pin is mounted to hold the pin against endwise displacement, and spring means having engaging hooks extended through said slots and engaging said heads to apply clamping pressure.

16. In a brake lining clamp adapted for use in cementing brake lining to a brake shoe of the type consisting of a web and a flange to which said brake lining is cemented; a clamping band comprising a plurality of band portions for encircling a pair of spaced brake shoes and contacting said brake lining, each end of each of said portions being reversely bent and secured to the main body of such portion to afford a transversely extending loop at each such end, each such loop having a slot formed therein, an anchoring pin disposed with each such slot and having an enlarged head portion formed thereon and disposed within the slot of the loop in which the pin is mounted to hold the pin against endwise displacement, and spring means having engaging hooks extended through said slots and engaging said heads to apply clamping pressure, and indicating loop members extended through said springs to indicate proper tensioning thereof when said clamping band is expanded.

17. In an apparatus for tensioning a resilient clamping band structure about a pair of brake shoes to resiliently clamp brake lining to the flanges of such brake shoes, said apparatus comprising a work table upon which such a pair of brake shoes and an encircling band structure may rest, a fixed abutment and a shiftable abutment extending upwardly from said table and adapted to engage adjacent surfaces of such a pair of brake shoes, each such abutment having a projecting lug near its upper end extending away from the other abutment so as to prevent excessive upward displacement of a brake shoe relative to said work table, an upstanding flange associated with each abutment upon which a spreader may rest after tensioning such a band structure, and means for moving said shiftable abutment away from said fixed abutment to tension said band.

18. In an apparatus for tensioning a resilient clamping band structure about a pair of brake shoes to resiliently clamp brake lining to the flanges of such brake shoes, said apparatus comprising a work table upon which such a pair of brake shoes and an encircling band structure may rest, a fixed abutment and a shiftable abutment extending upwardly from said table and adapted to engage adjacent surfaces of such a pair of brake shoes, each such abutment having a projecting lug near its upper end extending away from the other abutment so as to prevent excessive upward displacement of a brake shoe relative to said work table, and means for moving said shiftable abutment away from said fixed abutment to tension said band.

19. In a spreader structure for maintaining a pair of brake shoe and lining assemblies in spread position within a resilient contractile clamping band, a pair of parallel body members, means for guiding such members for endwise adjustment relative to each other, means for fixing said members in such adjusted position, and a pair of diverging arms fixed on opposite ends of the two adjustable members said arms each having a V-shaped notch in its end so that the notches in the two arms at each end of the spreader may engage the flange of a brake shoe.

20. A spreader structure having a pair of elongated body members each having a pair of diverging rigid arms at one end thereof, the arms of each pair having V-shaped notches in the ends thereof for engaging the flange of a brake shoe, and means for securing said body members in different adjusted positions to dispose said pairs of arms in different spaced relationships.

GEORGE W. LANGFORD.
GEORGE R. LANGFORD.

REFERENCES CITED

The following references are of record in the file of this patent:

UNITED STATES PATENTS

| Number | Name | Date |
|---|---|---|
| 1,869,343 | Parker | July 26, 1932 |
| 2,069,552 | Mikulasek | Feb. 2, 1937 |
| 2,358,483 | Tilden | Sept. 19, 1944 |